(12) United States Patent
Du et al.

(10) Patent No.: US 11,880,057 B2
(45) Date of Patent: Jan. 23, 2024

(54) DISPLAY DEVICE AND BACKLIGHT UNIT THEREFOR

(71) Applicant: Corning Incorporated, Corning, NY (US)

(72) Inventors: Guanglei Du, Pittsford, NY (US); Dmitri Vladislavovich Kuksenkov, Elmira, NY (US); Christopher Michael Lynn, Liberty, PA (US)

(73) Assignee: CORNING INCORPORATED, Corning, NY (US)

( * ) Notice: Subject to any disclaimer, the term of this patent is extended or adjusted under 35 U.S.C. 154(b) by 139 days.

(21) Appl. No.: 17/619,672

(22) PCT Filed: Jun. 10, 2020

(86) PCT No.: PCT/US2020/036901
§ 371 (c)(1),
(2) Date: Dec. 16, 2021

(87) PCT Pub. No.: WO2020/263563
PCT Pub. Date: Dec. 30, 2020

(65) Prior Publication Data
US 2022/0308277 A1 Sep. 29, 2022

Related U.S. Application Data

(60) Provisional application No. 62/866,949, filed on Jun. 26, 2019.

(51) Int. Cl.
F21V 8/00 (2006.01)
(52) U.S. Cl.
CPC ......... *G02B 6/0031* (2013.01); *G02B 6/0068* (2013.01); *G02B 6/0091* (2013.01)

(58) Field of Classification Search
CPC ... G02B 6/0031; G02B 6/0068; G02B 6/0091
See application file for complete search history.

(56) References Cited

U.S. PATENT DOCUMENTS

| 7,819,542 B2 | 10/2010 | Sato |
| 8,272,772 B2 | 9/2012 | Sato et al. |

(Continued)

FOREIGN PATENT DOCUMENTS

| CN | 102713411 A | * 10/2012 | ........... G02B 6/0091 |
| KR | 10-2013-0135971 A | 12/2013 | |

(Continued)

OTHER PUBLICATIONS

Rao et al., "Masking LED hot spots in a thin direct lit backlight unit using semitransparent and perforated masks", Opt. Comm. V. 315, 2014, pp. 258-264.

(Continued)

*Primary Examiner* — Mary Ellen Bowman
(74) *Attorney, Agent, or Firm* — Kevin M. Able

(57) ABSTRACT

A display device is disclosed. The display device includes a display panel assembly and a backlight unit positioned behind the display panel assembly, the backlight unit including a light guide plate and a backplane assembly. The backplane assembly comprises a printed circuit board and a plurality of light sources distributed thereon. The backplane assembly may further include a reflector and a support frame. The backplane assembly also includes a plurality of standoffs sized to provide a small, predetermined gap between the light sources and the light guide plate. An adhesive disposed in the gap couples the light sources to a surface of the light guide plate.

20 Claims, 13 Drawing Sheets

(56) References Cited

U.S. PATENT DOCUMENTS

| | | |
|---|---|---|
| 8,408,752 B2 | 4/2013 | Sato et al. |
| 9,081,229 B2 | 7/2015 | Sato et al. |
| 10,527,257 B2 * | 1/2020 | Yamada ............ G02F 1/133606 |
| 11,067,735 B2 | 7/2021 | Kuksenkov et al. |
| 11,513,392 B1 * | 11/2022 | Luo .................. G02F 1/133606 |
| 11,585,516 B2 * | 2/2023 | Yamada ............ G02F 1/133611 |
| 2007/0216849 A1 * | 9/2007 | Pan .................. G02F 1/136209 349/156 |
| 2010/0265694 A1 * | 10/2010 | Kim ..................... G02B 6/0021 362/97.1 |
| 2011/0309398 A1 * | 12/2011 | Ito ....................... H01L 33/505 257/E33.061 |
| 2012/0287606 A1 * | 11/2012 | Xiao .................... H05K 1/0206 362/97.1 |
| 2015/0234117 A1 * | 8/2015 | Kamada .............. G02B 6/0085 349/62 |
| 2018/0341054 A1 * | 11/2018 | Blessitt ................ G02B 6/0091 |
| 2019/0182970 A1 * | 6/2019 | Jeong ................ G02F 1/133602 |
| 2021/0397049 A1 | 12/2021 | Allen et al. |

FOREIGN PATENT DOCUMENTS

| | | | |
|---|---|---|---|
| KR | 20130135971 A * | 12/2013 | |
| KR | 10-2019-0070373 A | 6/2019 | |
| WO | 2006/126123 A1 | 11/2006 | |
| WO | WO-2011019050 A1 * | 2/2011 | ............... G02B 1/04 |
| WO | WO-2016061996 A1 * | 4/2016 | ............... G02B 6/00 |
| WO | 2019/040686 A1 | 2/2019 | |
| WO | 2019/046328 A1 | 3/2019 | |
| WO | WO-2019046328 A1 * | 3/2019 | ............. G02B 6/005 |
| WO | WO-2019046340 A1 * | 3/2019 | ........... G02B 6/0031 |

OTHER PUBLICATIONS

International Search Report and Written Opinion of the International Searching Authority; PCT /US2020/036901; dated Sep. 17, 2020; 09 pages; Korean Patent Office.

\* cited by examiner (a) (b) (c)

DISPLAY DEVICE AND BACKLIGHT UNIT THEREFOR

CROSS-REFERENCE TO RELATED APPLICATIONS

This application claims the benefit of priority under 35 U.S.C. § 371 of International Application No. PCT/US2020/036901, filed on Jun. 10, 2020, which claims the benefit of priority of U.S. Provisional Application Ser. No. 62/866,949 filed on Jun. 26, 2019 the contents of which are relied upon and incorporated herein by reference in their entity.

FIELD

The present disclosure relates generally to a display device, and more particularly a display device comprising a backlight unit for illuminating the display device, the backlight unit including standoffs disposed between a light guide plate and a backplane assembly.

BACKGROUND

Liquid crystal displays (LCDs) rely on a backlight unit (BLU) to produce illumination for the liquid crystal display panel. BLUs may comprise a light guide plate (LGP) configured to guide light from one or more light sources through the LGP, with provisions to extract the light from the backlight unit to the display panel. Light source can be provided along one or more edges of the LGP in so-called edge-lit display devices, or behind the light guide plate in so-called direct-lit display devices. On one hand, edge-lit display devices must accommodate light sources along an edge of the light backlight unit (e.g., LGP), contributing to a bezel to hide the light sources and associated electronics. On the other hand, direct-lit display devices, while simplifying local dimming schemes, must accommodate the thickness increase derived from a desire to uniformize the output of concentrated light sources positioned behind the display panel relative to a viewer. For direct-lit display devices, thickness increases are in direct conflict with a growing demand for thinner displays.

In some of BLU embodiments, when LED devices are in contact with the LGP, issues may ensue. If an LGP is made of glass and the LEDs are fabricated on sapphire, which means bonding fragile objects to each other, breakages and loss of yield can result. Additionally, glass has a very low coefficient of thermal expansion (CTE), much lower than that of FR4 glass epoxy and other common materials used to make printed circuit boards (PCBs). Since LEDs will be attached to the PCB, a change in ambient temperature can cause the PCB and LGP to expand or contract at different rates, creating stress in the bonding joints and potential failure.

Therefore, a need exists for mechanical designs and assembly techniques to facilitate ultra-thin backlights with optically-bonded LED devices that can alleviate these concerns.

SUMMARY

Direct-lit backlights may employ plastic "spikes" on the backplane assembly, for example the PCB housing the light sources, e.g., LEDs. These spikes support the next element of the backlight optical stack, for example an optical diffuser plate (DP), at a predetermined distance from the light sources. This distance can be quite large, for example in a range from about 9 mm to about 10 mm, even in high-end display devices (e.g., television sets).

To facilitate ultra-thin display devices, structures, e.g., standoffs, are disclosed that can eliminate the risk of damaging the light sources or the glass LGP during the process of optical bonding between them. The LGP can be supported a very short distance from the light source top surfaces to allow for the optical bond to be formed. For this purpose, standoffs can be used that are taller than the light sources, and the resultant gap between the light sources and the LGP is larger than the tolerance of light source height, such that the light sources in the array are not in direct contact with the LGP. Depending on the light source design and PCB attachment process, in various embodiments the gap can be at least 10 μm, at least 50 μm, or at least 200 μm, but less than about 1 mm, such that forming an optical contact is still possible.

In embodiments, the standoffs can be made of a reflective material, for example a white material, or at least reflective at the emission wavelength of the light sources, for example blue in the case where blue light sources and a color-converting quantum dot (QD) film are used in the backlight. This can help avoid unnecessary loss of light and potential changes in local brightness around the individual standoffs.

Standoffs can be attached to the backplane, the PCB, or a back reflector. The top surface of the standoffs may contact the LGP bottom surface. Since this can cause light extraction, it is beneficial that the areal size of the top surfaces of the standoffs is minimized. This can be achieved, for example, by using conical-shaped standoffs with a relatively "sharp" top, or by roughening a flat top surface of the standoffs if present. The total contact area of an individual standoffs should be less than about 50% of the cross-sectional area of the standoffs at the widest point in the standoffs, for example less than about 10% of the largest cross-sectional area.

Since, the height of the standoffs is small, of the same order as the thickness of the light sources chip package, which for the so-called chip scale package (CSP) could be in the range of 80 to 350 μm, the standoffs may be fabricated by printing or dispensing a predetermined sized drop of a curable plastic material such as an acrylic, an epoxy, or any other suitable material, and curing it. Depending on how well the material wets the surface, the resulting standoff shapes could be like shown in FIG. 2.

To provide support for the LGP, many standoffs distributed over the LGP surface in a regular or random pattern may be used. The patterns formed by contact between the standoffs and the LGP may look like an array of dots, or solid or dashed lines, or a grid, or any combination of the above, as shown in FIG. 4. The layout of the standoffs and their contact areas may or may not be correlated with LED positions.

The standoffs can be attached to, be a part of, or be made from the same material as the underlying structure, wherein the underlying structure can be a support frame, a PCB, or a reflector. A PCB or a reflector can be perforated to allow the standoffs to extend through the PCB or the reflector.

In some embodiments, standoffs can be positioned near individual light sources (e.g., LEDs), for example encircling each light source. The term encircling here does not necessarily imply a circular shape, only that the standoffs extend around all sides of the light source. For a square-shaped light source, the standoff structure can be an arbitrarily-shaped slab with a square aperture for the light source to extend through. The walls of the aperture may have an inward slope, in a direction toward the light source. If the sloped walls are coated with a reflective coating, or the standoffs are made of a reflective material, the walls can help collect and redirect light emitted from the sides of the light source so the light can be used more efficiently. The standoffs can be reflective at the wavelength(s) of the light emitted from the light source. In some embodiments, the top of the standoffs can be coated with a light absorbing coating, e.g., a black coating, for example a black ink. Such light absorbing area can improve the brightness uniformity of the BLU by eliminating a higher brightness ring-shaped area around the light sources. The surface coated by the absorbent coating can be roughened to prevent the contact area of the standoffs from becoming too large and causing unwanted light extraction.

The standoffs can be shaped as ridges and placed along the boundaries of the dimming zones. Since the ridges have minimal area on the top where they contact the LGP, if positioned at the edges of dimming zones, where maximally strong light extraction is desired, the contact will not cause brightness non-uniformity artifacts and can contribute to better light confinement within each dimming zone. As an example, should light reflected from the ridges produce higher brightness near the ridges, the aerial density (number or % coverage per unit area) at the contact area can be reduced, restoring good brightness uniformity.

The standoffs described above can enable simpler and a more robust display device and reduce the risk of damaging either the light sources or the LGP. To at least partially relieve stresses created by a coefficient of thermal expansion (CTE) mismatch between the LGP and the PCB material (as well as the adhesive used to couple the light sources to the LGP), the PCB can be provided with perforations extending through a thickness of the PCB. For example, the perforations can lower the effective elastic modulus of the PCB, making the PCB more easily deformed by CTE mismatch and reducing stress at the optical bond joints. Many different arrangements of perforations are possible. The perforations can be placed in a line at an angle to a line connecting two adjacent light sources. The line can be straight, bent, curved or zig-zag. The perforations can form several lines, a 2D matrix, or be random in position. The perforations can have different shapes. The perforations can be asymmetric. The perforations can be filled with a material different from the material of the PCB. These various configurations of perforations in the PCB can minimize stress in the adhesive (e.g., optically transparent adhesive or pressure sensitive tape).

In embodiments, the PCB can be non-planar or have a non-constant thickness. For example, if the PCB is thicker at the light source positions and thinner in the middle between light sources, CTE mismatch can cause the PCB to "warp" in 3-dimensional space, as opposed to simply expanding and contracting while remaining flat. If the PCB is non-planar, or corrugated, for example like an egg carton, but light sources are still located at the high points, all in approximately the same plane, CTE mismatch can cause the PCB to slightly "fold" in an accordion-like fashion, instead of a purely 2D linear expansion and contraction. In both cases, the force applied to the light source-LGP joints can be reduced.

Accordingly, a backlight unit is disclosed, comprising a light guide plate and a backplane assembly. The backplane assembly can comprise a printed circuit board comprising a plurality of light sources attached thereto, a plurality of standoffs extending from the backplane assembly toward and in contact with the light guide plate, the plurality of standoffs sized to form gaps equal to or less than about 1 mm between the plurality of light sources and the light guide plate, and an adhesive disposed in the gaps and coupling the plurality of light sources to the light guide plate. In some embodiments, the gaps can be equal to or less than about 100 µm.

In various embodiments, the backplane assembly can comprise a reflector positioned between the printed circuit board and the light guide plate, wherein the standoffs extend from the reflector toward the light guide plate.

In various other embodiments, the backplane assembly can comprise a reflector positioned between the printed circuit board and the light guide plate, wherein the standoffs extend from the printed circuit board toward the light guide plate.

In some embodiments, a standoff of the plurality of standoffs encircles a light source of the plurality of light sources, the standoff comprising an aperture through which the light source extends.

In some embodiments, the printed circuit board can comprise a plurality of apertures. For example, the plurality of printed circuit board apertures can be randomly distributed. In some embodiments, the plurality of printed circuit board apertures can vary in size.

The plurality of printed circuit board apertures can be aligned between adjacent light sources of the plurality of light sources. For example, the plurality of printed circuit board apertures can be arranged in two-dimensional arrays.

In some embodiments, at least one printed circuit board aperture of the plurality of printed circuit board apertures can be filled with a filler material different than a material of the printed circuit board. For example, the filler material can be a polymer material, such as an epoxy.

In some embodiments, the printed circuit board can be corrugated. For example, the printed circuit board can be corrugated in one or two dimensions.

In some embodiments, a thickness of the printed circuit board, defined along a normal extending between a first major surface of the printed circuit board and a second major surface of the printed circuit board opposite the first major surface, can vary across the printed circuit board, for example across a surface of the printed circuit board. For example, the thickness of the printed circuit board can be greater directly beneath individual light sources of the plurality of light sources than in locations adjacent the plurality of light sources (e.g., between individual light sources of the plurality of light sources).

In some embodiments, the plurality of standoffs can be continuous, for example continuous ridges, and arranged in rows, such as parallel rows.

In some embodiments, distal ends of the standoffs can be coated with a light absorbing material.

In various embodiments, the light guide plate can comprise glass.

In another embodiment, a display device is disclosed, comprising a display panel assembly and a backlight unit positioned proximate the display panel assembly, the backlight unit comprising a glass light guide plate and a backplane assembly. The backplane assembly can comprise a printed circuit board comprising a plurality of light sources attached thereto. A plurality of standoffs can extend from the backplane assembly toward and in contact with the light guide plate, the plurality of standoffs sized to form a gap equal to or less than about 1 mm between individual light sources of the plurality of light sources and the light guide plate, each standoff of the plurality of standoffs surrounding a light source of the plurality of light sources. Each standoff of the plurality of standoffs comprises an aperture through which the light source at least partially extends, and an adhesive is disposed in the gap that couples the plurality of light sources to the light guide plate. In embodiments, the plurality of standoffs can be attached to and extend from the printed circuit board.

In some embodiments, distal ends of the standoffs can be coated with a light absorbing material, for example a black ink.

In some embodiments, the gaps can be equal to or less than about 100 μm.

In various embodiments, the printed circuit board can comprise a plurality of apertures. The plurality of printed circuit board apertures can, for example, be randomly distributed across the printed circuit board, e.g., across a surface thereof. The plurality of printed circuit board apertures may vary in size across the printed circuit board.

In some embodiments, the plurality of printed circuit board apertures can be aligned between adjacent light sources of the plurality of light sources, for example aligned in a linear (e.g., one dimensional) array. In other embodiments, the plurality of printed circuit board apertures can be arranged in two-dimensional arrays.

In some embodiments, at least one printed circuit board aperture of the plurality of printed circuit board apertures can be filled with a filler material different than a material of the printed circuit board.

In some embodiments, the printed circuit board can be corrugated, e.g., shaped into alternate ridges and grooves. In other embodiments, the printed circuit board can be corrugated in two dimensions, e.g., two orthogonal dimensions, for example resembling an egg-carton.

In some embodiments, a thickness of the printed circuit board can vary across the printed circuit board, such as across a major surface of the printed circuit board. For example, the thickness of the printed circuit board can greater directly beneath light sources of the plurality of light sources than in locations between adjacent light sources of the plurality of light sources.

Additional embodiments disclosed herein will be set forth in the detailed description that follows. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other embodiments are better understood when the following detailed description is read with reference to the accompanying drawings, in which:

FIG. 12B is a close-up view of a portion of the display device of FIG. 16A; and

DETAILED DESCRIPTION

Figure 1A:
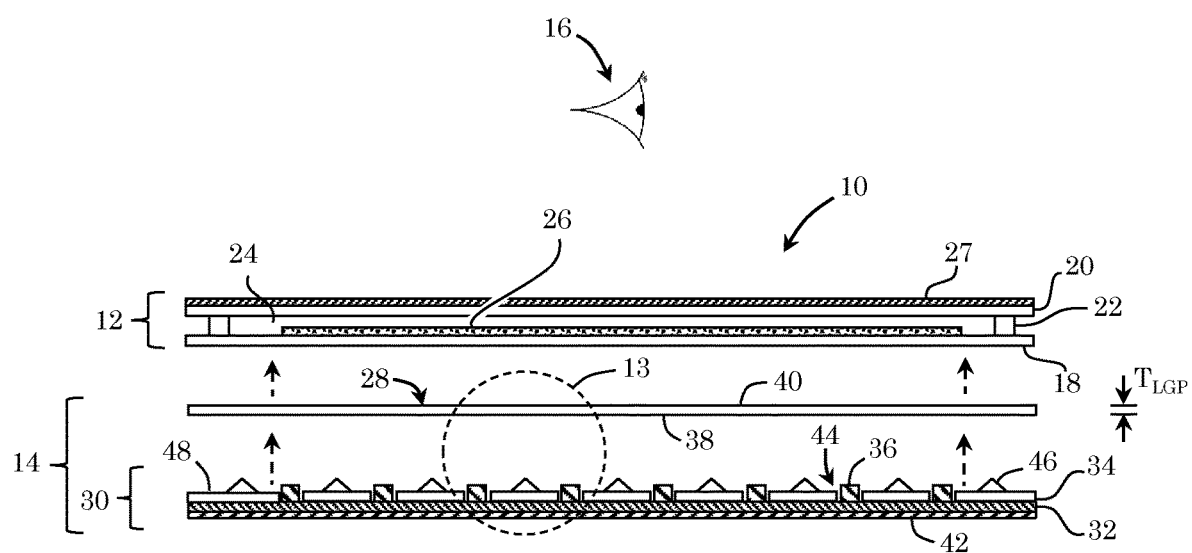
FIG. 1A is a cross-sectional side view of an exemplary display device according to embodiments of the present disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

As used herein, the terms "the," "a," or "an," mean "at least one," and should not be limited to "only one" unless explicitly indicated to the contrary. Thus, for example, reference to "a component" comprises embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to comprise the specific value or endpoint referred to. If a numerical value or endpoint of a range in the specification recites "about," the numerical value or endpoint of a range is intended to comprise two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

As used herein, the terms "comprising" and "including", and variations thereof shall be construed as synonymous and open-ended unless otherwise indicated.

Figure 1B:
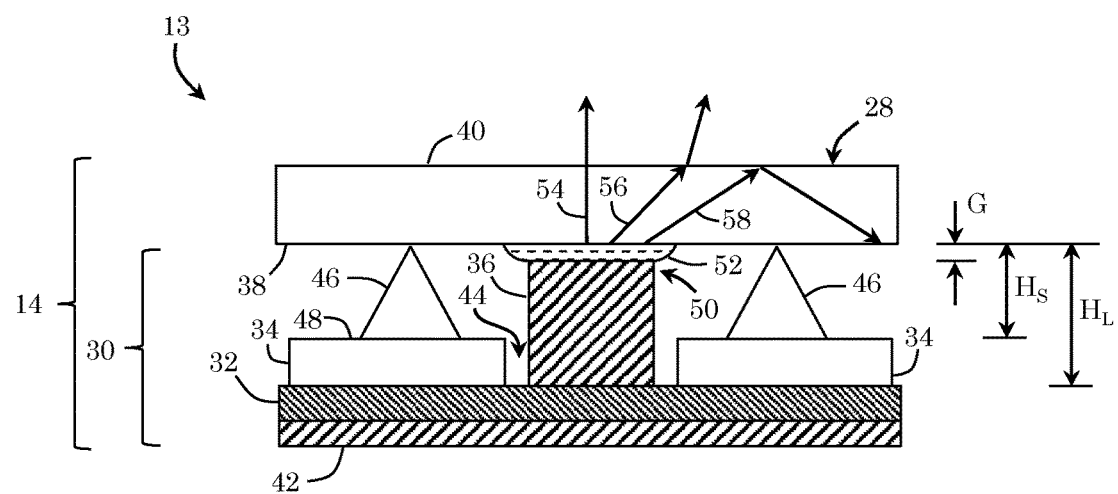
FIG. 1B is a close-up view of a portion of the display device of FIG. 1A.

FIG. 1A is a partially-exploded cross-sectional side view of an exemplary display device 10 comprising a display panel assembly 12 and a backlight unit 14 positioned behind display panel assembly 12 relative to a viewer 16. FIG. 1B is a close-up view of the region 13. Display panel assembly 12 may comprise a first substrate 18, a second substrate 20 positioned opposite first substrate 18, and a sealing material 22 positioned between first substrate 18 and second substrate 20, such as along peripheral edge portions of the substrates, that seals first substrate 18 to second substrate 20 with a gap 24 therebetween. First and second substrates 18, 20 may be glass substrates, comprising, for example, an aluminoborosilicate glass. Gap 24 may be filled with a liquid crystal material. One or more thin film transistors 26 may be positioned on first substrate 18 to control a polarization state of the liquid crystal material. Color filter material can be disposed on second substrate 20. Display panel assembly 12 may further comprise one or more additional layers, for example a polarization film 27 deposited on first substrate 18, although other films may also be included, such as an anti-reflection film.

Display device 10 may be a direct-lit display device, wherein BLU 14 can comprise LGP 28 and backplane assembly 30. LGP 28 can comprise a polymer substrate, for example a poly(methyl methacrylate) (PMMA) substrate, although in further embodiments, LGP 28 can be a glass substrate. LGP 28 can have a thickness $T_{LGP}$ defined orthogonally between a backside first major surface 38 and a frontside second major surface 40 in a range from about 0.5 mm to about 3 mm, for example in a range from about 0.7 mm to about 2 mm, such as in a range from about 1 mm to about 1.5 mm, including all ranges and subranges therebetween. First major surface 38 and second major surface 40 may be parallel or substantially parallel, although in further embodiments, first major surface 38 and second major surface 40 may be non-parallel. For example, in some embodiments, a cross-sectional shape of LGP 28 may be wedge-shaped. First major surface 38 faces backplane assembly 30, and may comprise a light scattering layer, e.g., a diffusing layer. In some embodiments, first major surface 38 may include quantum dot elements or other light conversion (e.g., color conversion) sites. Second major surface 40 faces display panel assembly 12. In some embodiments, second major surface 40 may comprise a light scattering layer, e.g., a diffusing layer.

Backplane assembly 30 may further comprise PCB 32 including a plurality of light sources 36, for example LEDs, that can be attached to PCB 32. Light sources 36 may be distributed over the surface of PCB 28 in a regular (e.g., periodic) array. For example, light sources 36 may be arranged in a rectangular array in orthogonal rows and columns, although other arrangements are possible. For example, in some embodiment, light sources 36 can be arranged in diagonal arrays, e.g., triangular or diamond-shaped arrays depending on the specific design of the display device. In some embodiments, light sources 36 can be functionally segregated into groups to facilitate local dimming protocols. Each group of light sources can represent a different light zone that can be independently controlled relative to other light zones. Local dimming is a technique by which localized light zones of a display can be dimmed to increase contrast between light portions of a displayed image and dark portions of a displayed image. A group of light sources can include a single light source or multiple light sources, depending, for example, on the size of the light sources, the number of light sources and their arrangement, and the desired number of light zones. Reflector 34 may further comprise a plurality of apertures 44 through which light sources 36 extend. Apertures 44 are distributed in the same pattern as the pattern of light sources 36.

Backplane assembly 30 may further comprise a support frame 42, for example an aluminum frame or a stainless-steel frame, configured to support LGP 28, PCB 32, and optionally reflector 34. Support frame 42 is positioned behind PCB 32 relative to display panel assembly 12.

BLU 14 may still further comprise a plurality of standoffs 46 sized to maintain a predetermined separation between light sources 36 and first major surface 38 of LGP 28. For example, in the embodiment of FIG. 1, standoffs 46 can be positioned on reflector 34, either as integral components (such that reflector 34 and standoffs 46 are monolithic) or as separate components coupled to reflector 34, for example adhered to reflector 34 by an adhesive. A height HS of standoffs 46 above a surface plane of the upper, exposed surface 48 of reflector 34 is greater than a height HL of light sources 36 such that when LGP 28 is positioned over the standoffs, a gap G is formed between the distal ends of light sources 36 (e.g., the ends farthest from reflector 34) and first major surface 38 of LGP 28 such that the distal ends 50 of the light sources do not contact LGP 28. Gap G can be, for example, in a range from about 10 micrometers (μm) to about 1 mm, for example in a range from about 20 μm to about 1 mm, in a range from about 30 μm to about 1 mm, in a range from about 50 µm to about 1 mm, in a range from about 100 µm to about 1 mm, or in a range from about 500 µm to about 1 mm.

Standoffs 46 may be configured to be reflective at an emission wavelength of light sources 36. For example, in some embodiments, standoffs 46 can be white, however in further embodiments, for example if a light output from light sources 36 is blue in color, the standoffs can be blue. This can help avoid unnecessary loss of light and potential changes in local brightness around an individual standoff. Because the distal ends of standoffs 46 typically contact first major surface 38 of LGP 28, which can cause light extraction, it is beneficial to minimize the surface area of the distal end 50 of the standoffs. For example, in some embodiments, standoffs 46 can have conical shapes with a relatively "sharp" distal end with minimal surface area, while in other embodiments, the distal ends can have larger surface areas and can be roughened to reduce contact area. In other embodiments, standoffs can have an elliptical shape, a cylindrical shape, or a rectangular shape. The total contact area of a standoff can be, for example, less than about 50% of the cross-sectional area of the standoff at the widest point of the standoff, such as less than about 10% of the cross-sectional area at the widest point of the standoff.

Figure 2:
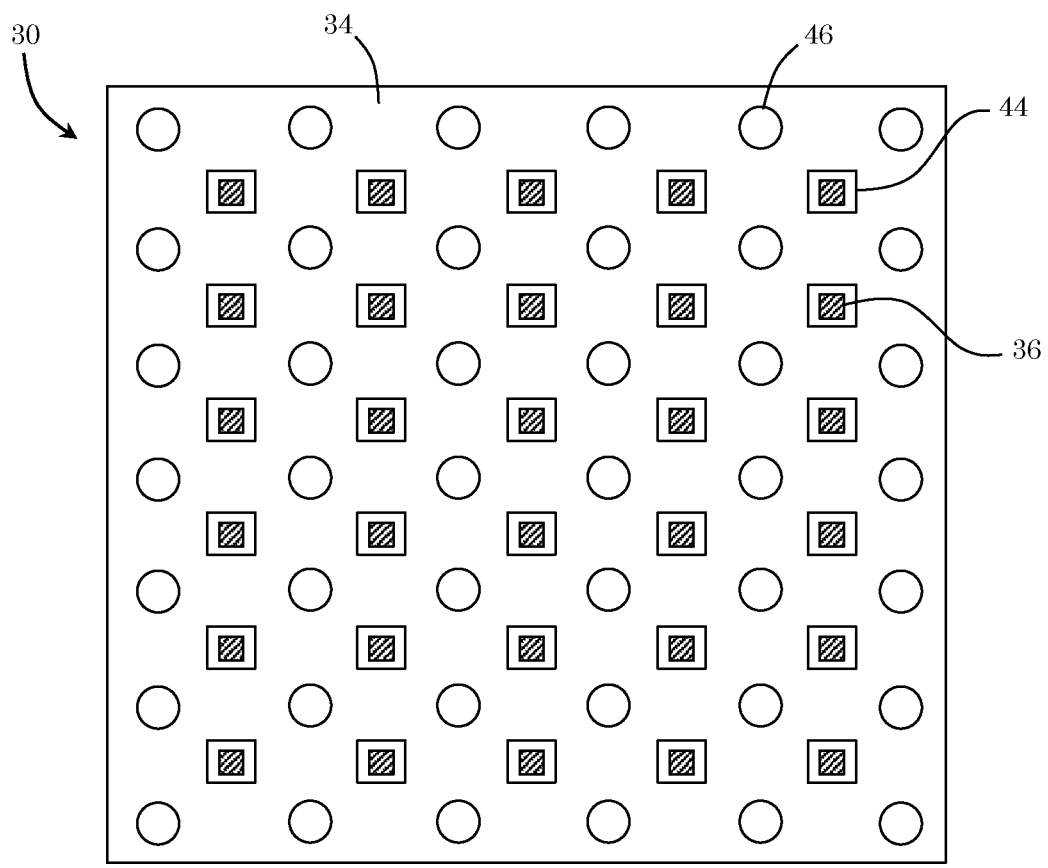
FIG. 2 is a top view of a backplane assembly according to embodiments of the present disclosure illustrating placement of discrete standoffs.

Standoffs 46 can be distributed in a variety of shapes and in a variety of patterns. For example, as illustrated in FIGS. 1 and 2, standoffs 46 can be shaped as conical or pyramidal, with a circular or rectangular (e.g., square) cross section in a plane parallel with a surface plane of reflector 34, although in further embodiments, standoffs can be rectangular pillars, or even spherical or elliptical. Standoffs 46 can be arranged periodically, in regular arrays. For example, FIG. 2 depicts a plurality of standoffs 46 arranged in orthogonal rows and columns. In other embodiments, standoffs 46 can be distributed in triangular or diamond-shaped arrays depending on the distribution of light sources 36. In some embodiments, standoffs 46 can be randomly distributed.

Figure 3A:
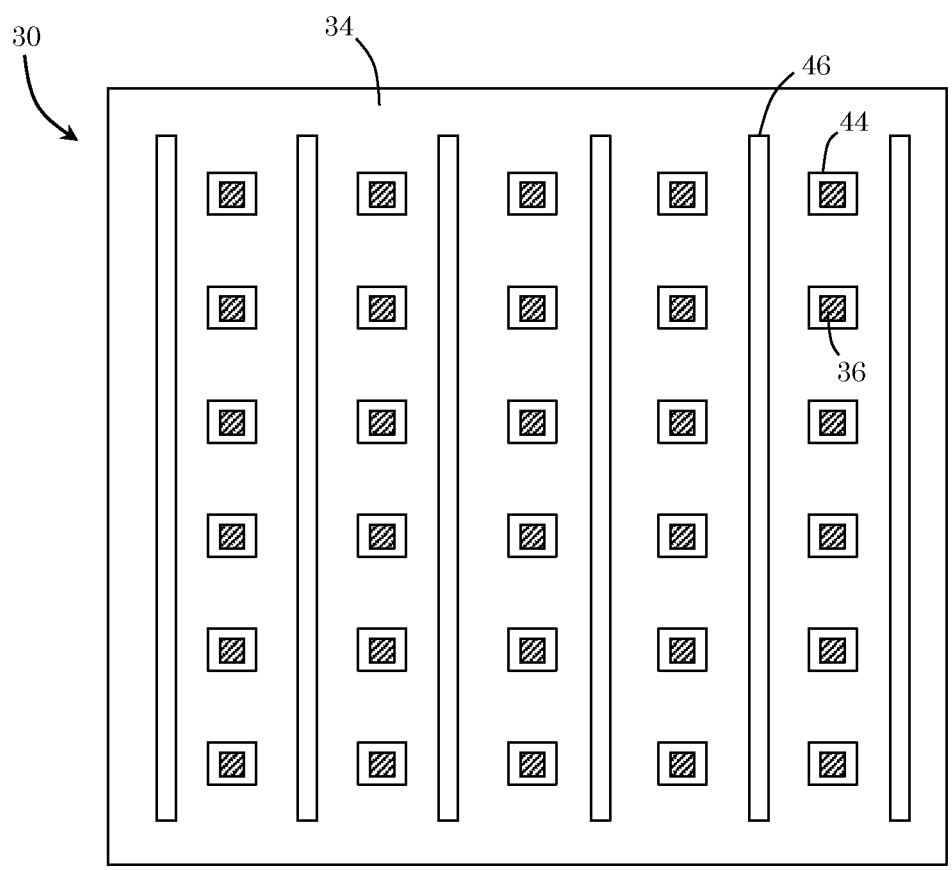
FIG. 3A is a top view of another embodiment of a backplane assembly according to embodiments of the present disclosure depicting continuous standoffs arranged in parallel rows.
Figure 3B:
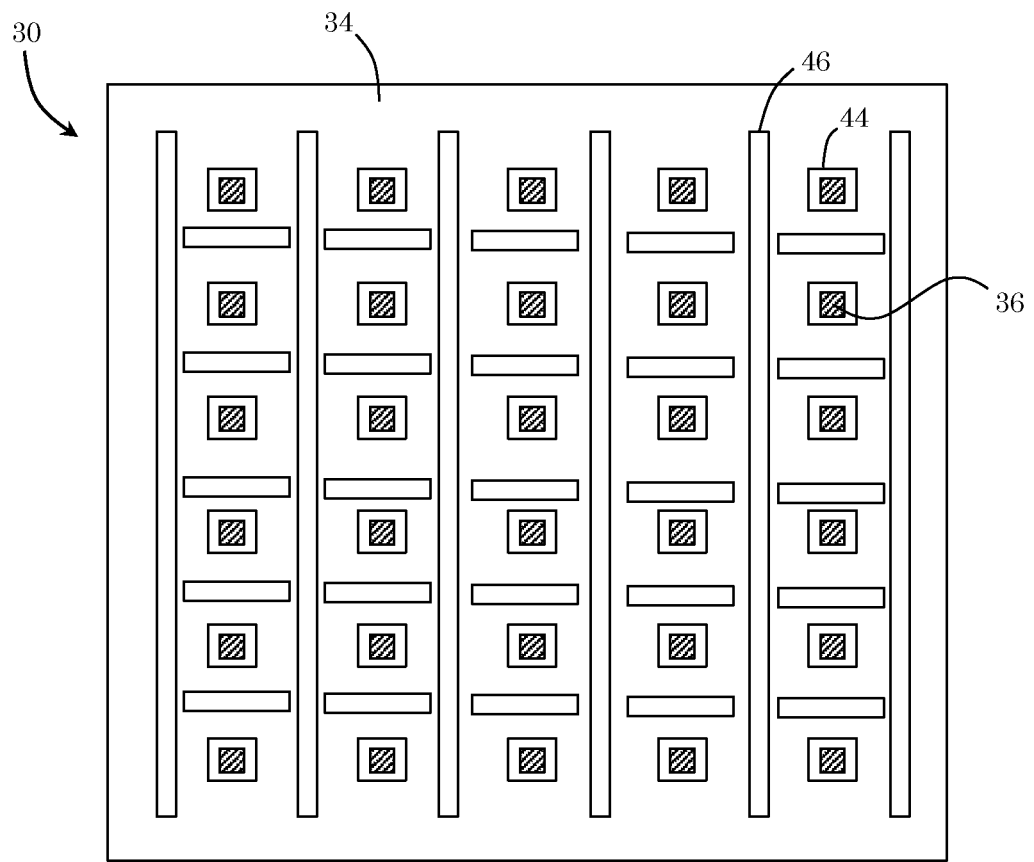
FIG. 3B is a top view of another embodiment of a backplane assembly according to embodiments of the present disclosure depicting continuous standoffs arranged in orthogonal rows and columns.

In some embodiments, as shown in FIG. 3A, standoffs 46 can comprise a continuous ridge or wall rather than discrete pillars. In the embodiment of FIG. 3A, standoffs 46 are arranged as columns of standoffs positioned between columns of light sources 36. However, other arrangements are possible. For example, FIG. 3B illustrates rows and columns of ridge-like standoffs. In the embodiment of FIG. 3B, the rows and columns do not intersect. However, in other embodiments, the rows and columns may intersect to form a grid. Depending on the arrangement of light sources 36, the standoff grid need not be a rectangular grid, but could, for example, be a diagonal grid, e.g., a triangular or diamond-shaped grid of intersecting ridges. In some embodiments, the rows and/or columns of continuous, ridge-like standoffs can border dimming zones. Since the ridges have minimal area on the top where they contact the LGP and are positioned at the edges of the dimming zones where maximally strong light extraction is desired, they will not cause brightness non-uniformity artifacts and may contribute to better light confinement within each dimming zone. If, in some embodiments, light reflected from the ridges produces higher brightness near the ridges, the aerial density (number or % coverage per unit area) of the light extraction features (e.g., ridge tops) can be reduced, restoring acceptable brightness uniformity.

Returning to FIG. 1B, in various embodiments, an adhesive 52 can be positioned in the gap G between ends of light sources 36 and first major surface 38 of LGP 28 that mechanically couples light sources 36 to LGP 28. Adhesive 52 can be, for example, an optically transparent adhesive that additionally optically couples light sources 36 to LGP 28, thereby coupling light emitted from light sources 36 into LGP 28. Adhesive 52 can be applied by a suitable dispensing tool, for example a digitally-controlled pipette or a large drop-size ink jet can be used to deposit a predetermined amount of a UV or thermally-curable optically transparent adhesive, for example an optically transparent epoxy adhesive, on at least one of the light sources 36 or LGP. A camera can be used to assist alignment of the adhesive. When LGP 28 is positioned on standoffs 46, a combination of wetting and surface tension forces can shape adhesive 52 between the light sources and LGP 28 in a symmetric fashion. The resulting shape can aid light coupling into the LGP by total internal reflection at the boundaries of the adhesive 52 and air, and to some extent compensate for the misalignment errors. In other embodiments, a pressure-sensitive adhesive tape can be applied to either one of the light sources or the LGP. When LGP 28 is positioned on standoffs 46, the pressure-sensitive tape should be compressed to achieve good adhesion. Without standoffs 46, applying a compression force could damage the light sources. Beneficially, standoffs 46 can provide a hard stop for motion between LGP 28 and backplane assembly 30, such that the sections of pressure-sensitive tape can experience sufficient pressure to achieve good adhesion, but forces exerted on the light sources do not exceed safe limits.

Light coupled into LGP 28 from light sources 36 can propagate laterally through LGP 28. Accordingly, some light rays may pass orthogonally through LGP 28, as represented by light ray 54, while some light rays may be refracted at second major surface 40, as represented by light ray 56, while still other light rays may experience total internal reflection between first major surfaces 38 and second major surface 40 and propagate laterally within LGP 28 between the two major surfaces, represented by light ray 58, until the light ray interacts with a scattering site that scatters the light and interrupts total internal reflection. For example, in some embodiments, LGP 28 may be provided with scattering features on at least one of first major surface 38 or second major surface 40 configured to scatter light at least in a forward direction toward display panel assembly 12.

Figure 4:
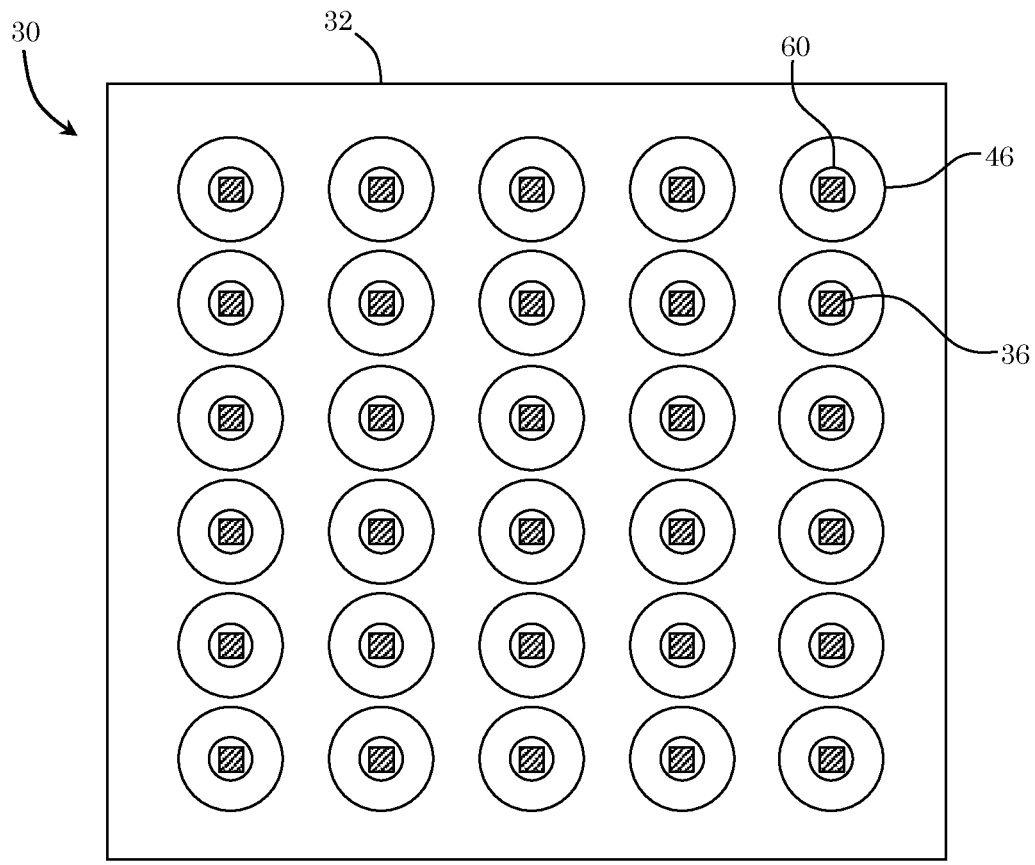
FIG. 4 is a top view of another embodiment of a backplane assembly according to embodiments of the present disclosure depicting standoffs including apertures through which light sources extend.
Figure 5:
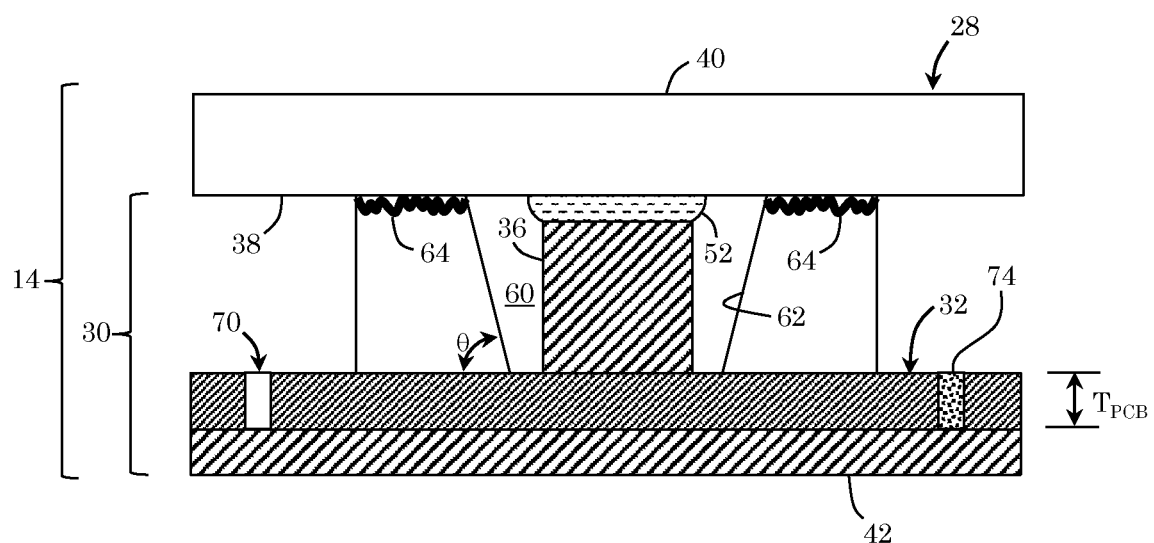
FIG. 5 is a side cross-sectional view of a portion of an exemplary backplane assembly according to embodiments of the present disclosure wherein top surface of the standoffs are coated with a light-absorbing material.

In some embodiments, standoffs 46 can comprise an aperture 60 such that a standoff 46 encircles a light source 36, as best seen in FIG. 4. In the embodiment of FIG. 3, plurality of annular standoffs 46 surround the plurality of light sources 36 such that a clear path is provided through the central apertures 60 for the passage of light from the light sources 36. In the embodiment of FIG. 3, standoffs 46 can function as reflectors and a separate reflector layer 34 is not needed. For example, referring to FIG. 5, inside walls 62 defining aperture 60 can be reflective, thereby reflecting light at high angles toward LGP 28. In various embodiments, inside walls can be angled at an angle θ relative to a normal to a surface plane of LGP 28. Although standoffs 46 in FIG. 4 are shown as circular, with circular apertures 60, circular standoffs are not required. In further embodiments, standoffs 46 can be other shapes, such as rectangular. For example, in some embodiments, standoffs 46 can be circular with rectangular apertures 60, while in other embodiments, standoffs 46 can be rectangular and comprise circular apertures 60. The shape of the standoffs and the shape of the interior apertures 60 are not limiting in this regard.

In some embodiments, an upper surface of standoffs 46 (e.g., distal ends 50) can be coated with a light-absorbing material 64. Such light absorbing areas can improve the brightness uniformity of BLU 14 by eliminating a higher brightness ring-shaped area around the light sources. In some embodiments, the upper surfaces of the standoffs 46 can be roughened to reduce contact area with LGP 28 and thereby reduce light extraction.

Figure 6:
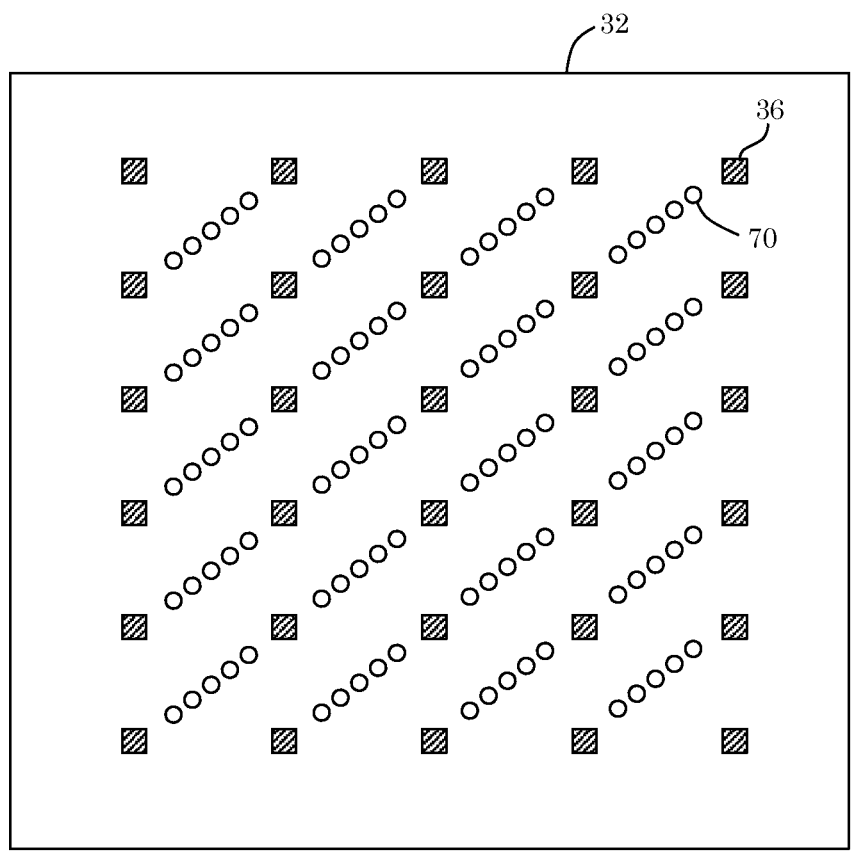
FIG. 6 is a top view of a printed circuit board for use in a backplane assembly according to embodiments of the present disclosure, the printed circuit board including a plurality of stress relieving apertures.
Figure 7:
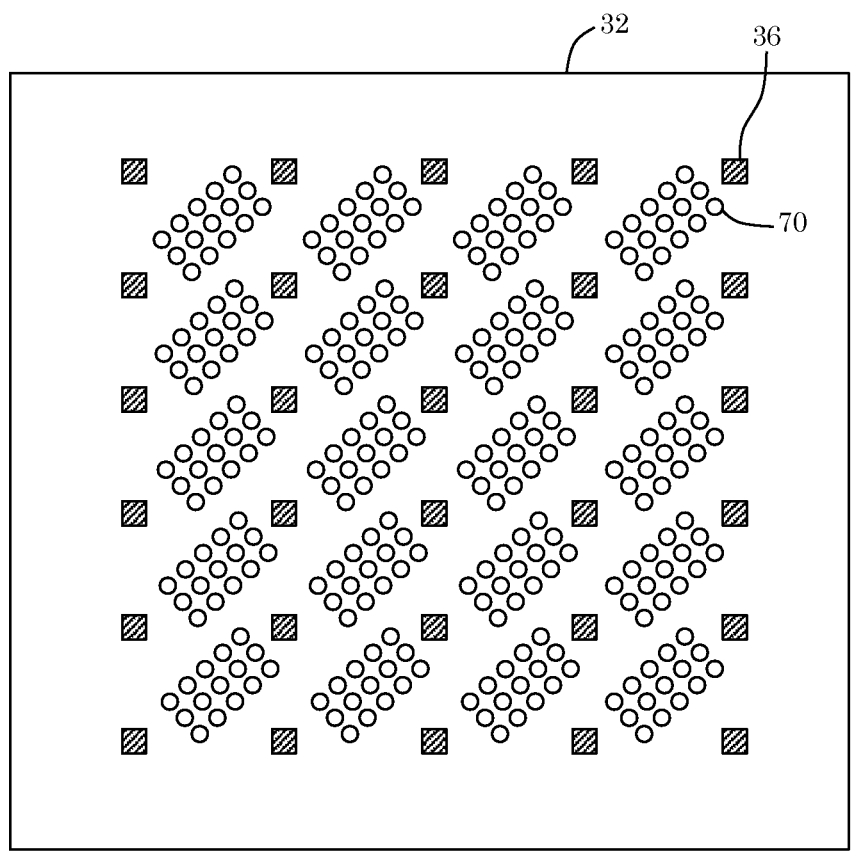
FIG. 7 is a top view of another printed circuit board for use in a backplane assembly according to embodiments of the present disclosure, the printed circuit board including a plurality of stress relieving apertures arranged as two-dimensional arrays.
Figure 8:
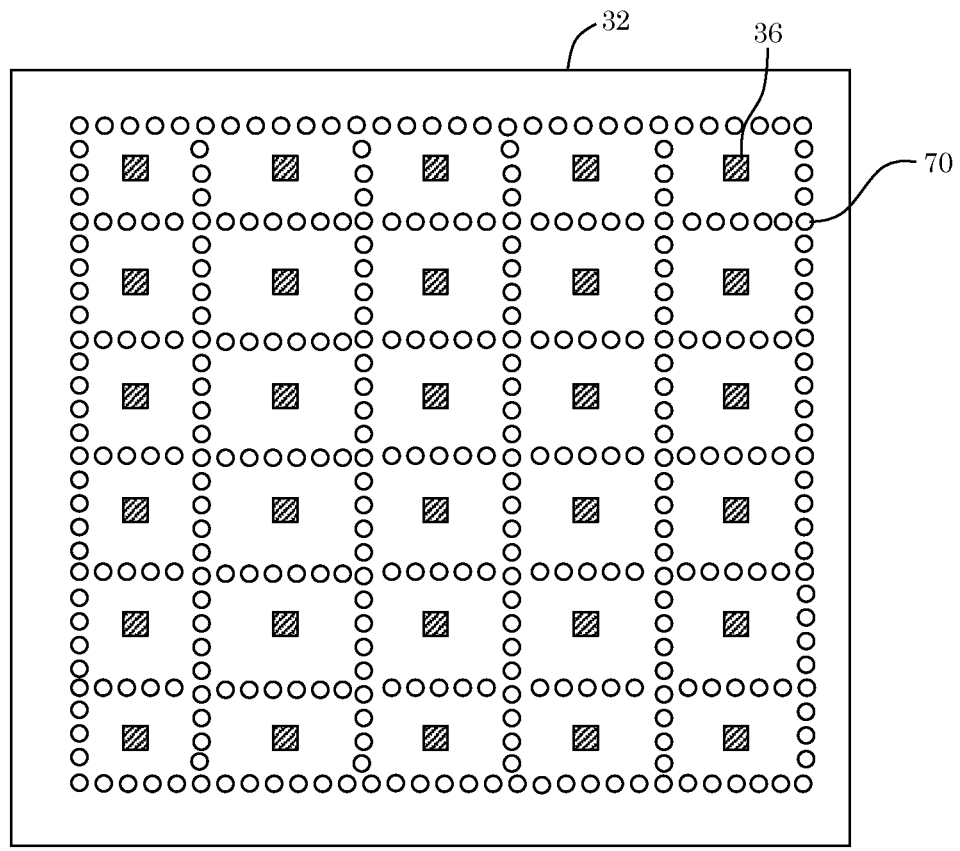
FIG. 8 is a top view of still another printed circuit board for use in a backplane assembly according to embodiments of the present disclosure, the printed circuit board including a plurality of stress relieving apertures that encircle light sources mounted on the printed circuit board.
Figure 9:
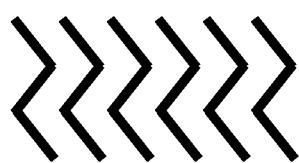
FIG. 9 is a view of various configurations for stress relieving apertures in a printed circuit board.
Figure 9:
Figure 9:
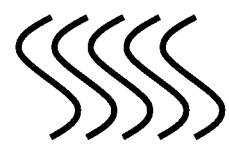

In various embodiments, PCB 32 can comprise a plurality of stress relief apertures 70 extending through a thickness $T_{PCB}$ of the PCB to relieve stress produced by any coefficient of thermal expansion (CTE) differences between PCB 32 and LGP 28, or between the adhesive 52 and LGP 28. For example, as shown in FIG. 6, PCB 32 can comprise an array of stress relief apertures 70 on a diagonal line between pairs of adjacent light sources 36, such that a plurality of linear arrays of stress relief apertures are distributed on PCB 32. FIG. 7 illustrates another embodiment, wherein a plurality of linear arrays of stress relief apertures 70 are positioned on diagonal lines between adjacent pairs of light sources 36, forming a group of linear arrays between any given pair of adjacent light sources. In still further embodiments, stress relief apertures 70 may be arranged to surround light sources 36. For example, FIG. 8 illustrates rows and columns of stress relief apertures 70 arranged to surround light sources 36. While FIGS. 6, 7, and 8 depict circular apertures, stress relief apertures 70 can be other shapes. For example, FIG. 9 illustrates zig-zag stress relief aperture shapes, (a), rectangular stress relief aperture shapes, (b), and serpentine stress relief aperture shapes, (c). Other shapes are possible, and the shape and placement of the stress relief apertures are not limited to circular, rectangular, zig-zag or serpentine. For example, other shapes may include elliptical, triangular, or diamond-shaped. Moreover, stress relief apertures 70 need not be of consistent shape or size. In some embodiments, the shape and/or size of stress relief apertures 70 can vary over PCB 32. The presence of stress relief apertures 70 in PCB 32 can lower the effective elastic modulus of the PCB, allowing the PCB to be more easily deformed by CTE mismatch and reducing the stress at the optical bond joints. In some embodiments, the stress relief apertures can be filled with a material 74 different than the material of the PCB. For example, the filling material may be a polymer material, for example an epoxy material. In other embodiments, the stress relief apertures may be left open (e.g., air-filled).

Figure 10:
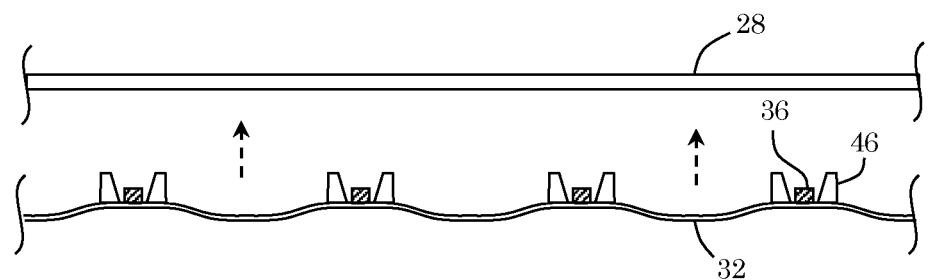
FIG. 10 is a side cross-sectional view of a portion of a backplane assembly wherein the printed circuit board is corrugated.

In still other embodiments, to reduce CTE-related stress, PCB 32 can be non-planar. For example, as shown in FIG. 10 (not to scale), in some embodiments, PCB 32 can be corrugated, wherein regions of the PCB are closer to LGP 28 than other regions. In FIG. 10, PCB 32 is shown positioned apart from LGP 28 for clarity. If PCB 32 is non-planar, or corrugated, with light sources 36 positioned at the high points (closer to LGP 28), but with the tops (distal ends) of the light sources in approximately the same plane to facilitate bonding to LGP 28), CTE mismatch will cause the PCB to slightly "fold" in an accordion-like fashion, instead of exhibiting purely 2D linear expansion and contraction. PCB 32 can be corrugated in one dimension, for example comprising parallel rows of alternating ridges and valleys extending along one-dimensional direction, or the corrugation can be in two dimensions wherein PCB takes on a shape resembling an egg carton, e.g., comprising alternating hills and depressions in either one of two orthogonal directions.

Figure 11:
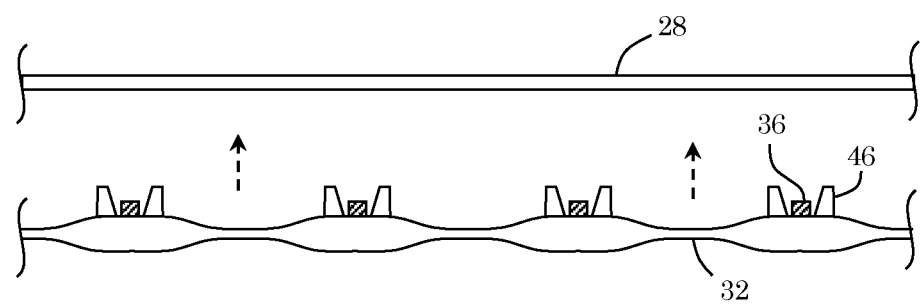
FIG. 11 is a side cross-sectional view of a portion of a backplane assembly wherein a thickness of the printed circuit board varies.

In other embodiments, as shown in FIG. 11, thickness $T_{PCB}$ can vary to reduce CTE-related stress. For example, $T_{PCB}$ can be greater (thicker) in regions supporting light sources 36, and thinner in regions between light sources. If PCB 32 is thicker at the light source positions and thinner between light sources, CTE mismatch may cause PCB 32 to flex or warp in 3-dimensionally rather than simply expanding and contracting while remaining flat, thereby causing a shift in position of the light sources.

Figure 12A:
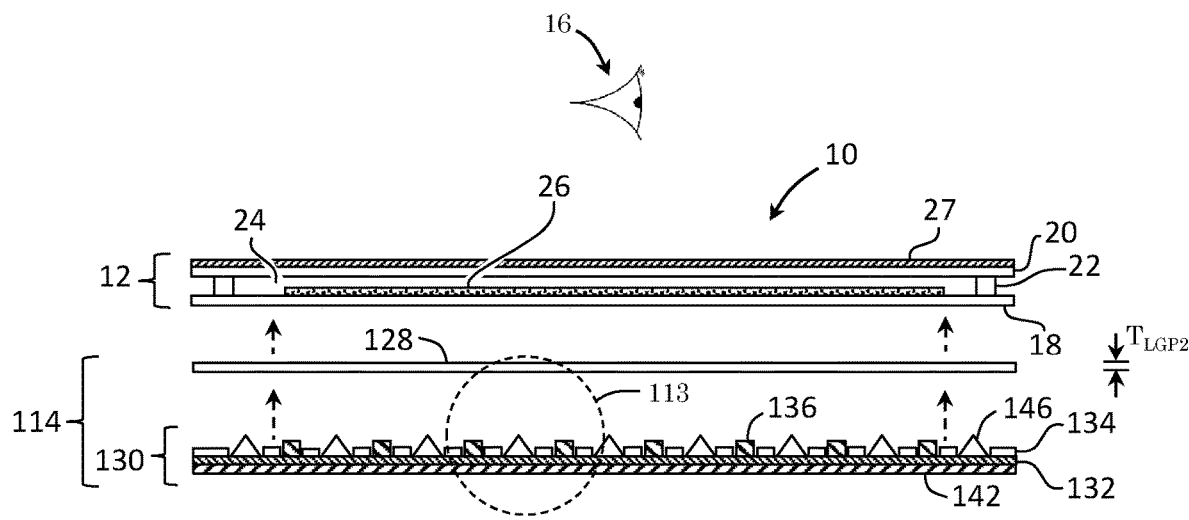
FIG. 12A is a cross-sectional side view of another exemplary display device according to embodiments of the present disclosure, wherein standoffs are mounted to a printed circuit board.
Figure 12B:
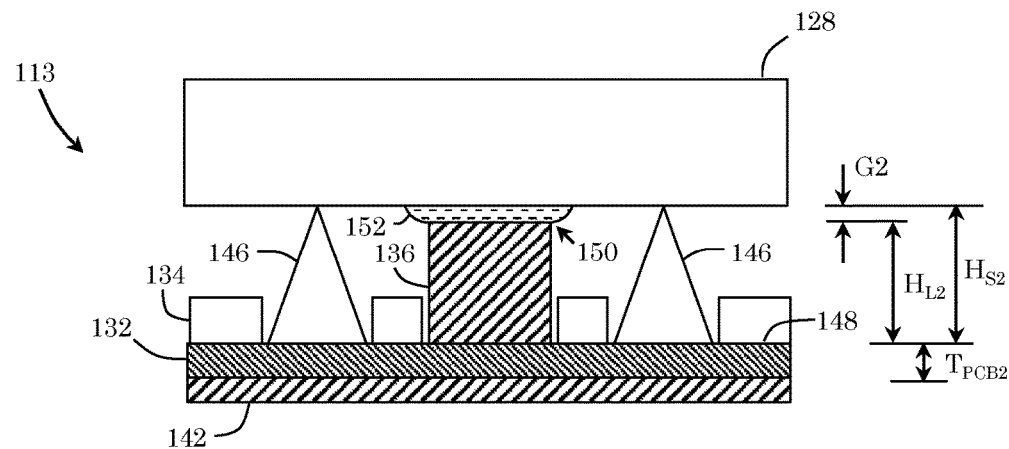
FIG. 12B is a close-up view of a portion of the display device of FIG. 12A.

FIG. 12A illustrates another embodiment of a display device 10 comprising a display panel assembly 12 and a backlight unit 114 positioned behind display panel assembly 12 relative to a viewer 16. FIG. 12B is a close-up view of the region 113. Display panel assembly 12 may comprise a first substrate 18, a second substrate 20 positioned opposite first substrate 18, and a sealing material 22 positioned between first substrate 18 and second substrate 20, such as along peripheral edge portions of the substrates, that seals first substrate 18 to second substrate 20 with a gap 24 therebetween. First and second substrates 18, 20 may be glass substrates, comprising, for example, an aluminoborosilicate glass. Gap 24 may be filled with a liquid crystal material. One or more thin film transistors 26 may be positioned on first substrate 18 to control a polarization state of the liquid crystal material. Color filter material can be disposed on second substrate 20. Display panel assembly 12 may further comprise one or more additional layers, for example a polarization film 27 deposited on first substrate 18, although other films may also be included, such as an anti-reflection film.

Display device 10 may be a direct-lit display device, wherein BLU 114 can comprise LGP 128 and backplane assembly 130. LGP 128 can comprise a polymer substrate, for example a poly(methyl methacrylate) (PMMA) substrate, although in further embodiments, LGP 128 can be a glass substrate. LGP 128 can have a thickness $T_{LGP2}$ defined orthogonally between a backside first major surface 138 and a frontside second major surface 140 in a range from about 0.5 mm to about 3 mm, for example in a range from about 0.7 mm to about 2 mm, such as in a range from about 1 mm to about 1.5 mm, including all ranges and subranges therebetween. First major surface 138 and second major surface 140 may be parallel or substantially parallel, although in further embodiments, first major surface 138 and second major surface 140 may be non-parallel. For example, in some embodiments, a cross-sectional shape of LGP 128 may be wedge-shaped. First major surface 138 faces backplane assembly 130, and may comprise a light scattering layer, e.g., a diffusing layer. In some embodiments, first major surface 138 may include quantum dot elements or other light conversion (e.g., color conversion) sites. Second major surface 140 faces display panel assembly 112. In some embodiments, second major surface 140 may comprise a light scattering layer, e.g., a diffusing layer.

Backplane assembly 130 may further comprise PCB 132 including a plurality of light sources 136, for example LEDs, that can be attached to PCB 132. Light sources 136 may be distributed over the surface of PCB 132 in a regular (e.g., periodic) array. For example, light sources 136 may be arranged in a rectangular array in orthogonal rows and columns, although other arrangements are possible. For example, in some embodiment, light sources 136 can be arranged in diagonal arrays, e.g., triangular or diamond-shaped arrays depending on the specific design of the display device. In some embodiments, light sources 136 can be functionally segregated into groups to facilitate local dimming protocols. Each group of light sources can represent a different light zone that can be independently controlled relative to other light zones. Local dimming is a technique by which localized light zones of a display can be dimmed to increase contrast between light portions of a displayed image and dark portions of a displayed image. A group of light sources can include a single light source or multiple light sources, depending, for example, on the size of the light sources, the number of light sources and their arrangement, and the desired number of light zones. Reflector 134 may further comprise a plurality of apertures 144 through which light sources 136 extend. Apertures 144 are distributed in the same pattern as the pattern of light sources 136.

Backplane assembly 130 may further comprise a support frame 142, for example an aluminum frame or a stainless-steel frame, configured to support LGP 128, PCB 132, and optionally reflector 134. Support frame 142 is positioned behind PCB 132 relative to display panel assembly 112.

BLU 114 may still further comprise a plurality of standoffs 146 sized to maintain a predetermined separation between light sources 136 and first major surface 138 of LGP 128. For example, in the embodiment of FIG. 12A-12B, standoffs 146 can be positioned on PCB 32, either as integral components (such that PCB 132 and standoffs 146 are monolithic) or as separate components coupled to PCB 132, for example adhered to PCB 132 by an adhesive. A height $H_{S2}$ of standoffs 146 above a surface plane of the upper surface 148 of PCB 132 is greater than a height $H_{L2}$ of light sources 136 such that when LGP 128 is positioned over the standoffs, a gap G2 is formed between the distal ends 150 of the light sources (e.g., the ends farthest from PCB 132) and first major surface 138 of LGP 128 such that the distal ends of the light sources 136 do not contact LGP 128. Gap G2 can be, for example, in a range from about 10 micrometers (µm) to about 1 mm, for example in a range from about 20 to about 1 mm, in a range from about 30 µm to about 1 mm, in a range from about 50 to about 1 mm, in a range from about 100 µm to about 1 mm, or in a range from about 500 µm to about 1 mm.

Standoffs 146 may be configured to be reflective at an emission wavelength of light sources 136. For example, in some embodiments, standoffs 146 can be white, however in further embodiments, for example if a light output from light sources 136 is blue in color, the standoffs can be blue. This can help avoid unnecessary loss of light and potential changes in local brightness around an individual standoff. Because distal ends of standoffs 146 typically contact first major surface 138 of LGP 128, which can cause light extraction, it is beneficial to minimize the surface area of the distal end 150 of the standoffs. For example, in some embodiments, standoffs 146 can have conical shapes with a relatively "sharp" distal end, while in other embodiments, the distal ends can be roughened to reduce contact area. However, in other embodiments, standoffs 146 can have an elliptical shape, a cylindrical shape, or a rectangular shape. The total contact area of a standoff 146 can be, for example, less than about 50% of the cross-sectional area of the standoff at the widest point of the standoff, such as less than about 10% of the cross-sectional area.

Figure 13:
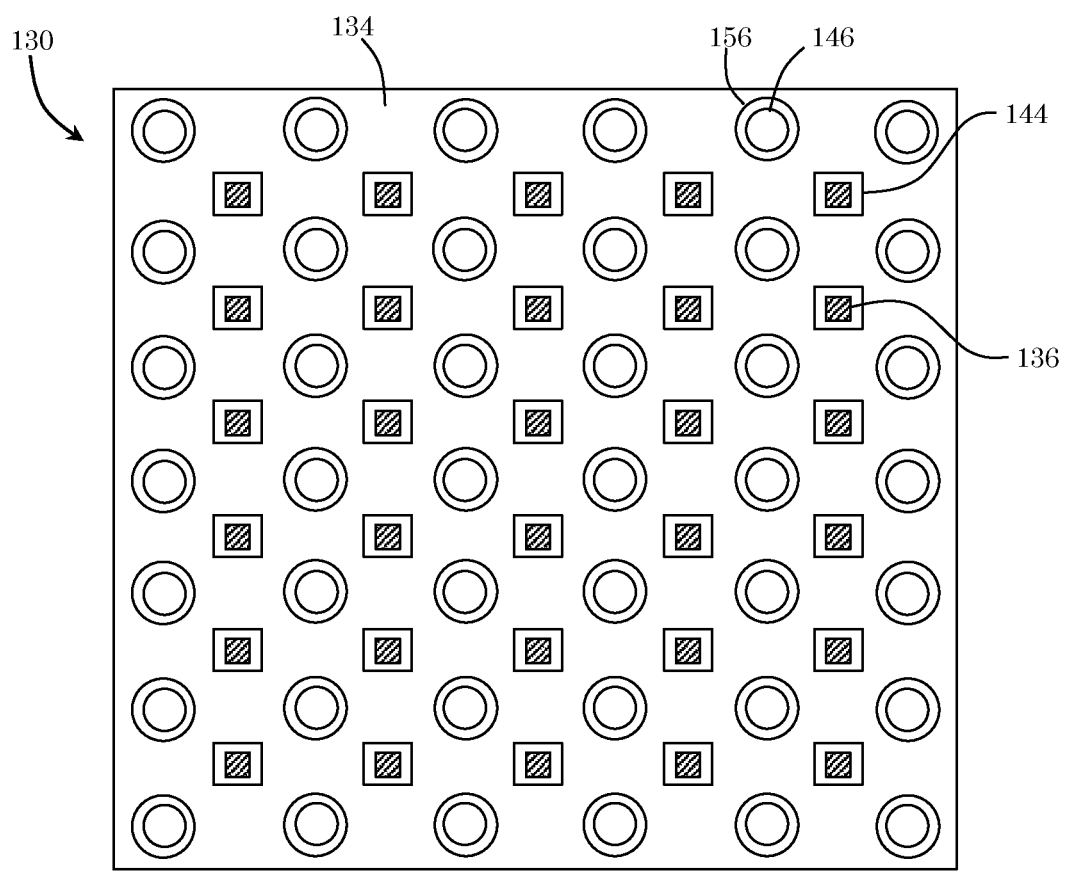
FIG. 13 is a top view of a backplane assembly according to the present disclosure, wherein the reflector comprises apertures through which printed circuit board-mounted standoffs extend, and additional apertures through which light sources extend.

Standoffs 146 can be distributed in a variety of shapes and in a variety of patterns. For example, standoffs 146 can be shaped similar or identical to standoffs 46 as illustrated in FIGS. 1 and 2, e.g., as conical or pyramidal, with a circular or rectangular (e.g., square) cross section in a plane parallel with a surface plane of PCB 132, although in further embodiments, standoffs 146 can be rectangular pillars, or even spherical or elliptical. Standoffs 146 can be arranged periodically, in regular arrays. For example, standoffs 146 can be arranged in orthogonal rows and columns similar or identical to standoffs 46 shown in FIG. 3. In other embodiments, standoffs 146 can be distributed in triangular or diamond-shaped arrays depending on the distribution of light sources 136. In some embodiments, standoffs 146 can be randomly distributed. In accordance with FIG. 13, reflector 134 may further comprise a plurality of apertures 156 through which standoffs 146 extend. The size and shape of apertures 156 should accommodate the size and shape of standoffs 146.

Figure 14:
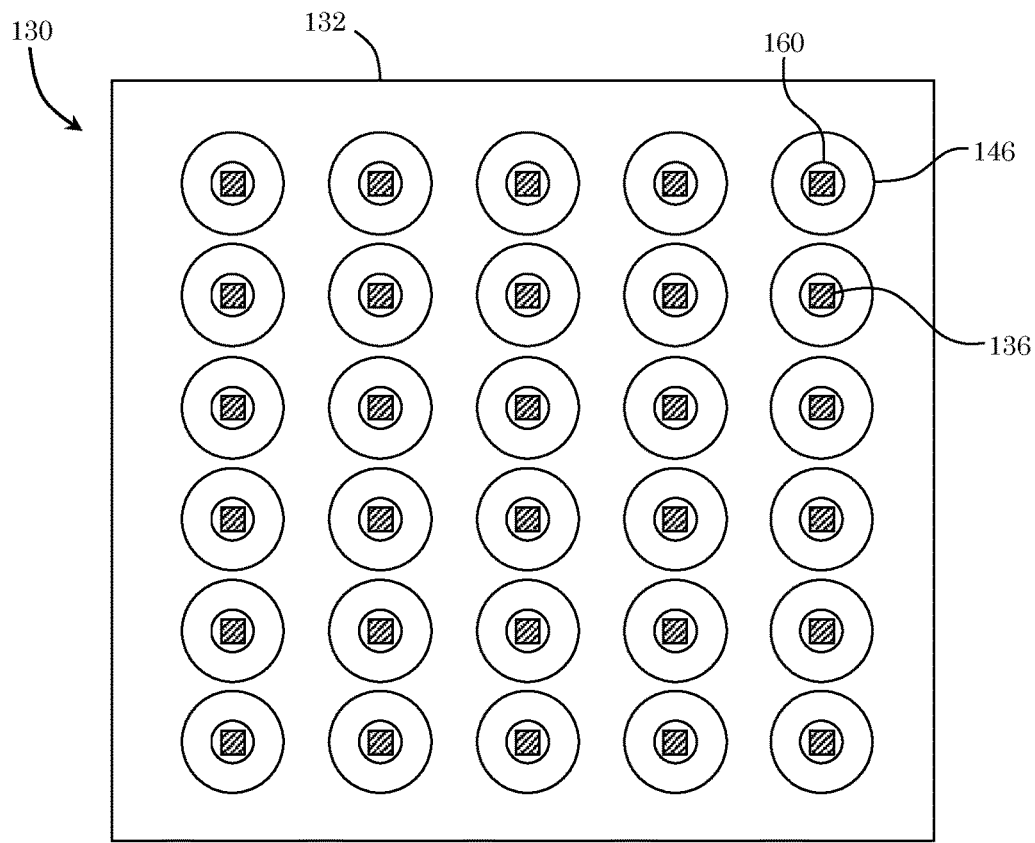
FIG. 14 is a top view of a backplane assembly according to the present disclosure, wherein the printed circuit board comprises standoffs including interior apertures through which light sources extend.
Figure 15:
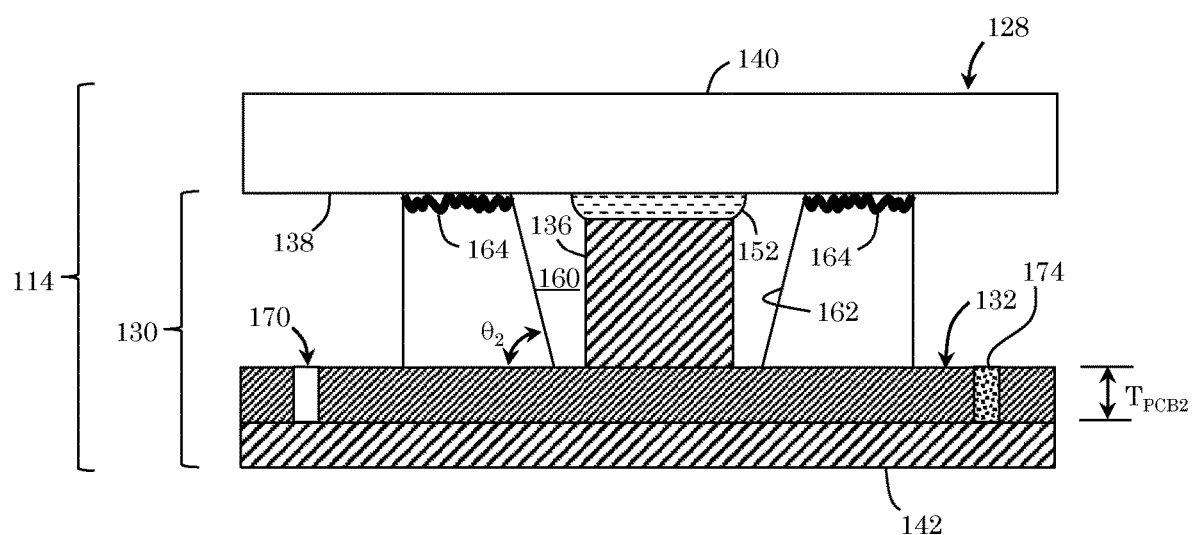
FIG. 15 is a close-up of a portion of the backplane assembly of FIG. 14 showing light absorbing coatings on a standoff.

In some embodiments, standoffs 146 can comprise an aperture 160 such that a standoff 146 encircles a light source 136, as best seen in FIG. 14. In the embodiment of FIG. 14, a plurality of annular standoffs 146 surround the plurality of light sources 136 such that a clear path is provided through the central apertures 160 for the passage of light from the light sources 136. In the embodiment of FIG. 14, standoffs 146 can function as reflectors and a separate reflector layer 134 is not needed. For example, referring to FIG. 15, inside walls 162 defining apertures 160 can be reflective, thereby reflecting light at high angles toward LGP 128. In various embodiments, inside walls can be angled at an angle $\theta_2$ relative to a normal to a surface plane of LGP 128. Although standoffs 146 in FIG. 14 are shown as circular, with circular apertures 160, circular standoffs are not required. In further embodiments, standoffs 146 can be other shapes, such as rectangular. For example, in some embodiments, standoffs 146 can be circular with rectangular apertures 160, while in other embodiments, standoffs 146 can be rectangular and comprise circular apertures 160. The shape of the standoffs and the shape of the interior apertures 160 are not limiting in this regard.

In some embodiments, an upper surface of standoffs 146 can be coated with a light-absorbing material 164. Such light absorbing areas can improve the brightness uniformity of BLU 114 by eliminating a higher brightness ring-shaped area around the light sources. In some embodiments, the upper surfaces of the standoffs 146 can be roughened to reduce contact area with LGP 128 and thereby reduce light extraction.

In various embodiments, PCB 132 can comprise a plurality of stress relief apertures 170 extending through a thickness $T_{PCB2}$ of PCB 132 in a manner similar or identical to those illustrated for PCB 32 in FIGS. 5-9 to relieve stress produced by any coefficient of thermal expansion (CTE) differences between PCB 132 and LGP 128, or between the optically transparent adhesive 152 and LGP 128.

For example, PCB 132 can comprise an array of stress relief apertures on a diagonal line between pairs of adjacent light sources, such that a plurality of linear arrays of stress relief apertures are distributed on PCB 132 in a manner similar or identical to that shown in FIG. 6 for PCB 32. The plurality of linear arrays of stress relief apertures can be positioned on diagonal lines between adjacent pairs of light sources 136, forming a group of linear arrays between any given pair of adjacent light sources 136 in a manner similar or identical to those shown in FIG. 7 for PCB 32. In still further embodiments, stress relief apertures may be arranged to surround light sources 136 in a manner similar or identical to those shown in FIG. 8 for PCB 32. While FIGS. 6, 7, and 8 depict circular stress relief apertures, stress relief apertures in PCB 132 can be other shapes. For example, FIG. 9 illustrates zig-zag stress relief aperture shapes, (a), rectangular stress relief aperture shapes, (b), and serpentine stress relief aperture shapes, (c), that could be applied to the stress relief apertures in PCB 132. Other shapes are possible, and the shape and placement of the stress relief apertures are not limited to circular, rectangular, zig-zag or serpentine. For example, other shapes may include elliptical, triangular, or diamond-shaped. Moreover, stress relief apertures in PCB 132 need not be of consistent shape or size. In some embodiments, the shape and/or size of stress relief apertures in PCB 132 can vary. The presence of stress relief apertures in PCB 132 can lower the effective elastic modulus of the PCB, allowing the PCB to be more easily deformed by CTE mismatch and reducing the stress at the optical bond joints. In some embodiments, the stress relief apertures can be filled with a material different than the material of the PCB in a manner similar or identical to that shown in FIG. 5 for PCB 32. For example, the filling material may be a polymer material, for example an epoxy material. In other embodiments, the stress relief apertures may be left open (e.g., air-filled).

In still other embodiments, to reduce CTE-related stress, PCB 132 can be non-planar in a manner similar or identical to that shown in FIG. 10 for PCB 32. For example, as shown in FIG. 10 (not to scale), in some embodiments, the PCB 132 can be corrugated, wherein regions of PCB 132 are closer to LGP 28 than other regions. If the PCB is non-planar, or corrugated, with light sources 136 positioned at the high points (closer to the LGP), but with the tops (distal ends) of the light sources in approximately the same plane to facilitate bonding to LGP 128), CTE mismatch will cause the PCB to slightly "fold" in an accordion-like fashion, instead of exhibiting purely 2D linear expansion and contraction.

In other embodiments, the thickness $T_{PCB2}$ of PCB 132 can vary in a manner similar or identical to that for PCB 32 shown in FIG. 11 to reduce CTE-related stress. For example, $T_{PCB2}$ can be greater (thicker) in regions supporting light sources 136, and thinner in regions between the light sources. If PCB 132 is thicker at the light source positions and thinner between light sources, CTE mismatch can cause PCB 132 to flex or warp in 3-dimensionally rather than simply expanding and contracting while remaining flat.

Figure 16A:
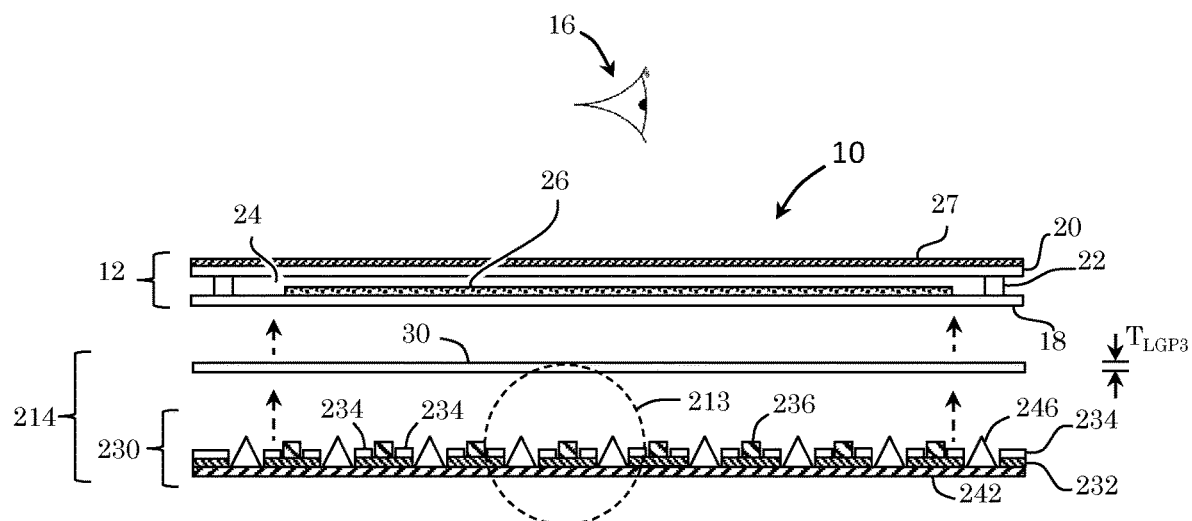
FIG. 16A is a cross-sectional side view of still another exemplary display device according to embodiments of the present disclosure, wherein standoffs are mounted to a frame.
Figure 16B:
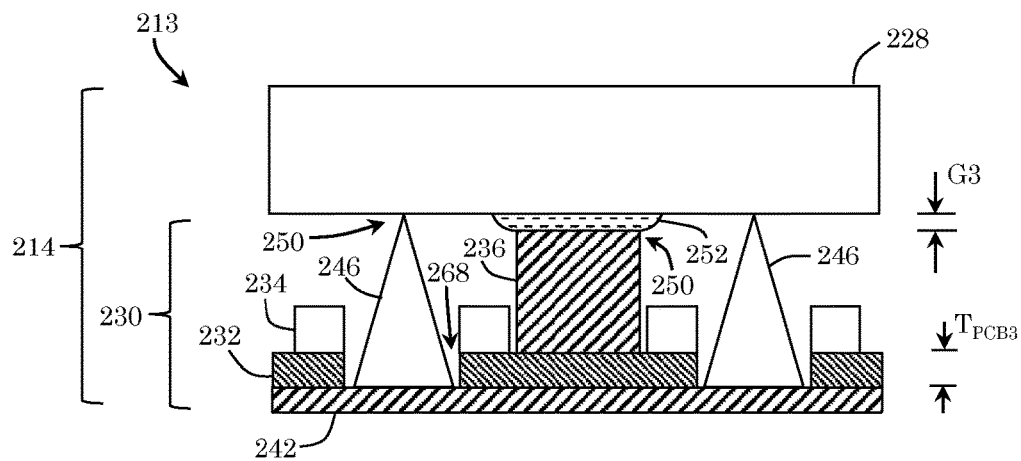
FIG. 16B is a side cross-sectional view of a portion of the backplane assembly of FIG. 16A.

FIG. 16A illustrates still another embodiment of a display device 10 comprising a display panel assembly 12 and a backlight unit 214 positioned behind display panel assembly 12 relative to a viewer 16. FIG. 16B is a close-up view of the region 213. Display panel assembly 12 may comprise a first substrate 18, a second substrate 20 positioned opposite first substrate 18, and a sealing material 22 positioned between first substrate 18 and second substrate 20, such as along peripheral edge portions of the substrates, that seals first substrate 18 to second substrate 20 with a gap 24 therebetween. First and second substrates 18, 20 may be glass substrates, comprising, for example, an aluminoborosilicate glass. Gap 24 may be filled with a liquid crystal material. One or more thin film transistors 26 may be positioned on first substrate 18 to control a polarization state of the liquid crystal material. Color filter material can be disposed on second substrate 20. Display panel assembly 12 may further comprise one or more additional layers, for example a polarization film 27 deposited on first substrate 18, although other films may also be included, such as an anti-reflection film.

Display device 10 may be a direct-lit display device, wherein BLU 214 can comprise LGP 228 and backplane assembly 230. LGP 228 can comprise a polymer substrate, for example a poly(methyl methacrylate) (PMMA) substrate, although in further embodiments, LGP 228 can be a glass substrate. LGP 228 can have a thickness $T_{LGP3}$ defined orthogonally between a backside first major surface 238 and a frontside second major surface 240 in a range from about 0.5 mm to about 3 mm, for example in a range from about 0.7 mm to about 2 mm, such as in a range from about 1 mm to about 1.5 mm, including all ranges and subranges therebetween. First major surface 238 and second major surface 240 may be parallel or substantially parallel, although in further embodiments, first major surface 238 and second major surface 240 may be non-parallel. For example, in some embodiments, a cross-sectional shape of LGP 228 may be wedge-shaped. First major surface 238 faces backplane assembly 230, and may comprise a light scattering layer, e.g., a diffusing layer. In some embodiments, first major surface 238 may include quantum dot elements or other light conversion (e.g., color conversion) sites. Second major surface 240 faces display panel assembly 212. In some embodiments, second major surface 240 may comprise a light scattering layer, e.g., a diffusing layer.

Backplane assembly 230 may further comprise PCB 232 including a plurality of light sources 236, for example LEDs, that can be attached to PCB 232. Light sources 236 may be distributed over the surface of PCB 228 in a regular (e.g., periodic) array. For example, light sources 236 may be arranged in a rectangular array in orthogonal rows and columns, although other arrangements are possible. For example, in some embodiment, light sources 236 can be arranged in diagonal arrays, e.g., triangular or diamond-shaped arrays depending on the specific design of the display device. In some embodiments, light sources 236 can be functionally segregated into groups to facilitate local dimming protocols. Each group of light sources can represent a different light zone that can be independently controlled relative to other light zones. Local dimming is a technique by which localized light zones of a display can be dimmed to increase contrast between light portions of a displayed image and dark portions of a displayed image. A group of light sources can include a single light source or multiple light sources, depending, for example, on the size of the light sources, the number of light sources and their arrangement, and the desired number of light zones. Reflector 234 may further comprise a plurality of apertures 244 through which light sources 236 extend. Apertures 244 are distributed in the same pattern as the pattern of light sources 236.

Backplane assembly 230 may further comprise a support frame 242, for example an aluminum frame or a stainless-steel frame, configured to support LGP 228, PCB 232, and optionally reflector 234. Support frame 242 is positioned behind PCB 232 relative to display panel assembly 212.

BLU 214 may still further comprise a plurality of standoffs 246 sized to maintain a predetermined separation between light sources 236 and first major surface 238 of LGP 228. For example, in the embodiment of FIG. 16A, standoffs 246 can be positioned on support frame 242, either as integral components (such that PCB 132 and standoffs 146 are monolithic) or as separate components coupled to support frame 242, for example adhered to support frame 242 by an adhesive. Standoffs 246 are sized such that when LGP 228 is positioned over the standoffs, a gap G3 is formed between distal ends of the standoffs (e.g., the ends farthest from support frame 242) and first major surface 238 of LGP 228 such that the distal ends 250 of the light sources do not contact LGP 228. Gap G3 can be, for example, in a range from about 10 micrometers (μm) to about 1 mm, for example in a range from about 20 μm to about 1 mm, in a range from about 30 μm to about 1 mm, in a range from about 50 to about 1 mm, in a range from about 100 μm to about 1 mm, or in a range from about 500 μm to about 1 mm.

Standoffs 246 may be configured to be reflective at an emission wavelength of light sources 236. For example, in some embodiments, standoffs 246 can be white, however in further embodiments, for example if a light output from light sources 236 is blue in color, the standoffs can be blue. This can help avoid unnecessary loss of light and potential changes in local brightness around an individual standoff. Because distal ends of standoffs 246 typically contact first major surface 238 of LGP 128, which can cause light extraction, it is beneficial to minimize the surface area of the distal end 250 of the standoffs. For example, in some embodiments, standoffs 246 can have conical shapes with a relatively "sharp" distal end, while in other embodiments, the distal ends can be roughened to reduce contact area. However, in other embodiments, standoffs 246 can have an elliptical shape, a cylindrical shape, or a rectangular shape. The total contact area of a standoff 246 can be, for example, less than about 50% of the cross-sectional area of the standoff at the widest point of the standoff, such as less than about 10% of the cross-sectional area.

Standoffs 246 can be distributed in a variety of shapes and in a variety of patterns. For example, standoffs 246 can be shaped similar or identical to standoffs 46 in FIGS. 1A and 1B, e.g., as conical or pyramidal, with a circular or rectangular (e.g., square) cross section in a plane parallel with a surface plane of PCB 232, although in further embodiments, standoffs 246 can be rectangular pillars, or even spherical or elliptical. Standoffs 246 can be arranged periodically, in regular arrays. For example, standoffs 246 can be arranged similar or identical to standoffs 46 in FIG. 3, e.g., in orthogonal rows and columns. In other embodiments, standoffs 246 can be distributed in triangular or diamond-shaped arrays depending on the distribution of light sources 236. In some embodiments, standoffs 246 can be randomly distributed. Both PCB 232 and reflector 234 may further comprise pluralities of apertures through which standoffs 246 extend. The size and shape of the apertures should accommodate the size and shape of standoffs 246.

In some embodiments, an upper surface of standoffs 246 can be coated with a light-absorbing material. Such light absorbing areas can improve the brightness uniformity of BLU 214 by eliminating a higher brightness ring-shaped area around the light sources. In some embodiments, upper surfaces of the standoffs can be roughened to reduce contact area with LGP 228 and thereby reduce light extraction.

In various embodiments, PCB 232 can comprise a plurality of apertures 268 extending through a thickness $T_{PCB2}$ of PCB 232 to provide a passage through which standoffs 246 can extend. In addition, PCB 232 may further include a plurality of additional apertures in a manner similar or identical to those shown in FIGS. 6-9 in respect of PCB 32 to relieve stress produced by any coefficient of thermal expansion (CTE) differences between PCB 232 and LGP 228, or between the optically transparent adhesive 252 and LGP 228.

For example, PCB 232 can comprise an array of stress relief apertures on a diagonal line between pairs of adjacent light sources, such that a plurality of linear arrays of apertures are distributed on PCB 232 in a manner similar or identical to stress relief apertures 70 shown in FIG. 6 for PCB 32. The plurality of linear arrays of apertures can be positioned on diagonal lines between adjacent pairs of light sources 236, forming a group of linear arrays between any given pair of adjacent light sources 236 in a manner similar or identical to those shown in FIG. 7 for PCB 32. In still further embodiments, stress relief apertures may be arranged to surround light sources 236 in a manner similar or identical to those shown in FIG. 8 for PCB 32. While FIGS. 6, 7, and 8 depict circular stress relief apertures, stress relief apertures in PCB 232 can be other shapes. For example, FIG. 9 illustrates zig-zag stress relief aperture shapes, (a), rectangular stress relief aperture shapes, (b), and serpentine stress relief aperture shapes, (c), that could be applied to the apertures in PCB 232. Other shapes are possible, and the shape and placement of the stress relief apertures are not limited to circular, rectangular, zig-zag or serpentine. For example, other shapes may include elliptical, triangular, or diamond-shaped. Moreover, stress relief apertures in PCB 232 need not be of consistent shape or size. In some embodiments, the shape and/or size of stress relief apertures in PCB 232 can vary. The presence of stress relief apertures in PCB 232 can lower the effective elastic modulus of the PCB, allowing the PCB to be more easily deformed by CTE mismatch and reducing the stress at the optical bond joints. In some embodiments, the stress relief apertures can be filled with a material different than the material of the PCB in a manner similar or identical to that shown in FIG. 5 for PCB 32. For example, the filling material may be a polymer material, for example an epoxy material. In other embodiments, the stress relief apertures may be left open (e.g., air-filled).

In still other embodiments, to reduce CTE-related stress, PCB 232 can be non-planar in a manner similar or identical to that shown in FIG. 10 for PCB 32. For example, as shown in FIG. 10 (not to scale), in some embodiments, the PCB 232 can be corrugated, wherein regions of PCB 232 are closer to LGP 228 than other regions. If PCB is non-planar, or corrugated, with light sources 236 positioned at the high points (closer to the LGP), but with the tops (distal ends) of the light sources in approximately the same plane to facilitate bonding to LGP 228), CTE mismatch will cause the PCB to slightly "fold" in an accordion-like fashion, instead of exhibiting purely 2D linear expansion and contraction.

In other embodiments, the thickness $T_{PCB3}$ of PCB 232 can vary in a manner similar or identical to that for PCB 32 shown in FIG. 11 to reduce CTE-related stress. For example, $T_{PCB3}$ can be greater (thicker) in regions supporting light sources 236, and thinner in regions between the light sources. If PCB 232 is thicker at the light source positions and thinner in the between light sources, CTE mismatch will cause PCB 232 to flex or warp in 3-dimensionally rather than simply expanding and contracting while remaining flat.

While various embodiments have been described in detail with respect to certain illustrative and specific embodiments thereof, the present disclosure should not be considered limited to such, as numerous modifications and combinations of the disclosed features are possible without departing from the scope of the following claims.

What is claimed is:

1. A display device, comprising:
   a display panel assembly;
   a backlight unit positioned proximate the display panel assembly, the backlight unit comprising a light guide plate and a backplane assembly, the backplane assembly comprising:
   a printed circuit board comprising a plurality of light sources attached thereto;
   a plurality of standoffs extending from the backplane assembly toward and in contact with the light guide plate, the plurality of standoffs sized to form gaps equal to or less than about 1 mm between the plurality of light sources and the light guide plate, the plurality of standoffs comprising at least one of discrete pillars or continuous ridges, wherein one continuous ridge does not intersect another continuous ridge; and
   an adhesive disposed in the gaps and coupling the plurality of light sources to the light guide plate.

2. The display device of claim 1, wherein the gaps are equal to or less than about 100 μm.

3. The display device of claim 1, wherein the backplane assembly comprises a reflector positioned between the printed circuit board and the light guide plate, the standoffs extending from the reflector toward the light guide plate.

4. The display device of claim 1, wherein the backplane assembly comprises a reflector positioned between the printed circuit board and the light guide plate, the standoffs extending from the printed circuit board toward the light guide plate.

5. The display device of claim 4, wherein a standoff of the plurality of standoffs encircles a light source of the plurality of light sources, the standoff comprising an aperture through which the light source at least partially extends.

6. The display device of claim 1, wherein the printed circuit board comprises a plurality of apertures.

7. The display device of claim 1, wherein the printed circuit board is corrugated.

8. The display device of claim 7, wherein the printed circuit board is corrugated in two dimensions.

9. The display device of claim 1, wherein a thickness of the printed circuit board varies across the printed circuit board.

10. The display device of claim 9, wherein the thickness of the printed circuit board is greater directly beneath the plurality of light sources than in locations adjacent the plurality of light sources.

11. The display device of claim 1, wherein distal ends of the standoffs are coated with a light absorbing material.

12. A backlight unit, comprising:
    a glass light guide plate and a backplane assembly, the backplane assembly comprising:
        a printed circuit board comprising a plurality of light sources attached thereto; and
        a plurality of standoffs extending from the backplane assembly toward and in contact with the light guide plate, the plurality of standoffs sized to form a gap equal to or less than about 1 mm between individual light sources of the plurality of light sources and the light guide plate, each standoff of the plurality of standoffs surrounding a light source of the plurality of light sources, each standoff of the plurality of standoffs comprising an aperture through which the light source at least partially extends, the plurality of standoffs comprising at least one of discrete pillars or continuous ridges, wherein one continuous ridge does not intersect another continuous ridge; and
        an adhesive disposed in the gap and coupling the plurality of light sources to the light guide plate.

13. The backlight unit of claim 12, wherein the plurality of standoffs are attached to and extend from the printed circuit board.

14. The backlight unit of claim 12, wherein distal ends of the standoffs are coated with a light absorbing material.

15. The backlight unit of claim 12, wherein the printed circuit board comprises a plurality of printed circuit board apertures.

16. The backlight unit of claim 15, wherein the plurality of printed circuit board apertures are randomly distributed across the printed circuit board.

17. The backlight unit of claim 15, wherein the plurality of printed circuit board apertures vary in size across the printed circuit board.

18. The backlight unit of claim 15, wherein the plurality of printed circuit board apertures are arranged in two-dimensional arrays.

19. The backlight unit of claim 15, wherein at least one printed circuit board aperture of the plurality of printed circuit board apertures is filled with a filler material different than a material of the printed circuit board.

20. The backlight unit of claim 12, wherein the printed circuit board is corrugated.

* * * * *